May 30, 1933.   W. NOBLE   1,911,383
HEATING ELEMENT
Original Filed May 27, 1929   2 Sheets-Sheet 1
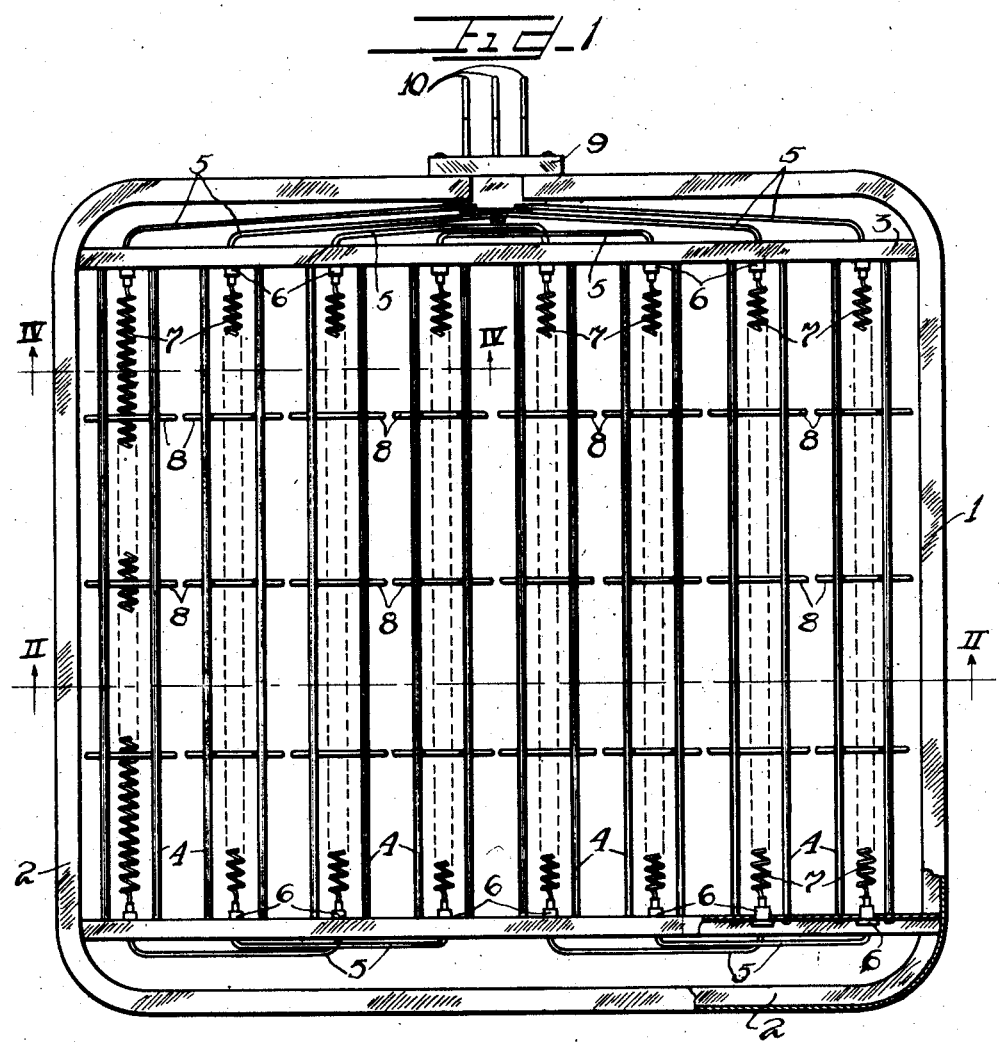
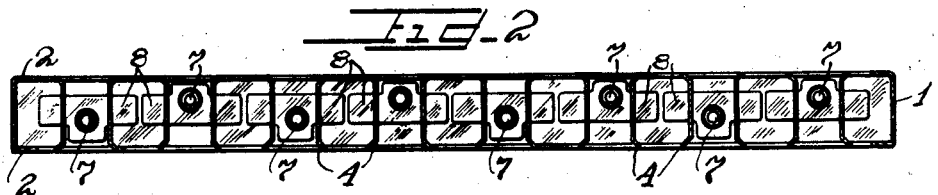
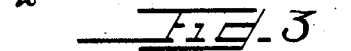
Inventor
Warren Noble
by Charles F. Hills Attys.

May 30, 1933. W. NOBLE 1,911,383
HEATING ELEMENT
Original Filed May 27, 1929 2 Sheets-Sheet 2
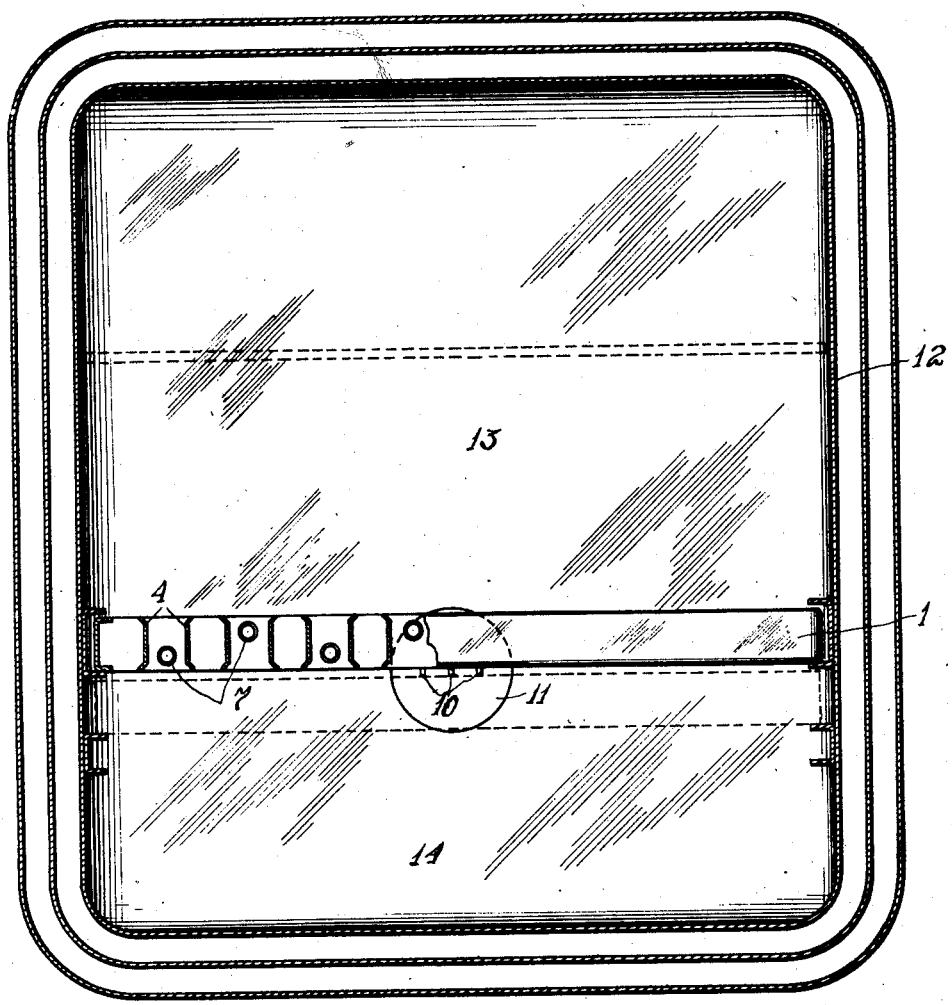
Inventor
Warren Noble
by Charles H. Hill Attys.

Patented May 30, 1933

1,911,383

UNITED STATES PATENT OFFICE

WARREN NOBLE, OF DETROIT, MICHIGAN, ASSIGNOR TO ELECTROMASTER, INC., OF DETROIT, MICHIGAN, A CORPORATION OF MICHIGAN

HEATING ELEMENT

Original application filed May 27, 1929, Serial No. 366,315, now Patent No. 1,831,820, dated November 17, 1931. Divided and this application filed March 26, 1930. Serial No. 439,252.

This invention relates to an improved heating element and more particularly to an oven burner especially adapted for use in domestic cooking ovens.

The present application constitutes divisional subject matter taken from my co-pending patent application, serial No. 366,315, filed May 27, 1929, which issued in Patent No. 1,831,820 and pertains to oven and burner.

An object of the invention is to provide a heating element or burner for use with an oven in such a way that highly satisfactory results in quality and efficiency of cooking may be obtained and the oven may be adapted to the cooking of an extensive variety of dishes without requiring a duplication of burners and with marked economy.

At this time, however, I wish to point out the fact that my invention is not limited to use with an oven but may be used with equal advantages in many other applications where a simplified and inexpensive electrical heating element is required.

An object of the invention is to provide a heating element which will by its particular structure have the inherent quality of promoting convection in an oven to a high degree and afford an evenness of heat distribution throughout the oven which will lend itself to thorough and even cooking of dishes placed within the oven for that purpose. It has been found by actual practice that the materially different conditions attending the broiling of steaks and fish, the roasting of meats, the baking of vegetables, and the baking of cakes and biscuits may be all readily met in an oven equipped with the type of burner hereinafter described, and the cooking of such articles in a generally more satisfactory manner than in ovens as heretofore equipped, so that an oven having a burner of the improved type also lends itself to better cooking by inexperienced operators mainly due to its better heat distribution.

A further object of the said invention is to provide an oven burner characterized by its open structure whereby air may flow readily therethrough with heating elements directly heating the air passing through the burner, and heat collecting members receiving heat by radiation from the elements and reradiating the heat to the air for the further promotion of convection currents to the burner. More particularly the invention contemplates the provision in a substantially open electric oven burner a series of more or less parallel heating elements and a series of members substantially parallel to said elements and adapted to be heated by radiation from the elements, said elements and said members being exposed to the path of air passing through the burner.

Still further it is an object to provide, in the over burner, partitions forming flues between the heating elements whereby the walls of the flues are heated by said elements; and these partitions are preferably of such construction and strength that they may be utilized as supports for cooking utensils within the oven. It is also proposed to utilize the partitions as spacing means for the support of the heating elements of the burner within the frame of the burner.

An object of the invention is also to provide a very convenient structural assembly in the burner whereby it may be manufactured mainly from strips of metal of quite light weight without sacrificing general strength, beauty of appearance or efficiency of operation.

Still further objects are to provide a frame for support of the coils which will permit of minimum amount of wiring being used to connect the various coils together and to terminals and which will likewise, by its constructions, provide a guard for the wiring; and to provide two positions for the burner within the oven, and an attachment or plug for insertion into a socket in the back of the oven, the plug being so formed as to be capable of fitting into one socket regardless of the position assumed by the burner.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawings, wherein:

Figure 1 is a plan, partly broken away and in section, illustrating a burner embodying the said improvements;

Figure 2 is a transverse section of the same taken on the line $2^x$—$2^x$ of Figure 1;

Figure 3 is a fragmentary detail side view of one end of the burner showing the offset terminal arrangement; and Figure 4 is a vertical transverse section of an oven having such a burner incorporated therein to provide upper and lower compartments in the oven, both heated by the said burner and adapted to free air convection therebetween.

Similar characters of reference indicate similar parts in the several figures of the drawings.

The burner is shown as comprising a rectangular frame 1 having inwardly flanged upper and lower edge portions 2, and arranged transversely of this frame and adjacent the ends thereof are two parallel strips 3. Extending between these two strips and lengthwise of the burner are a series of parallel partitions 4, connected to the said strips in any suitable manner not shown in detail as the methods of making such connections are so well known.

The transverse strips 3 carry wiring connections 5, the extremities of which project through suitable insulators 6 mounted in the said strips and to these extremities of the wiring connections heating elements in the form of coils 7 are secured to form a wired heating element assembly within the burner structure, as will be readily apparent. The said heating elements lie between and parallel to certain of the said partitions 4 and are supported intermediate of their lengths by transverse insulators 8 which are shaped to form spacers extending between and mounted in the said partitions, as shown in Figures 1 and 2. These insulators 8 maintain the parallel relationship of the heating elements to the partitions and also support the said elements against sagging.

It will be obvious that the arrangement described provides an extremely open structure and a burner having, as a whole, quite low specific heat, so that there is comparatively very little heat absorption in the burner structure itself. Consequently, electric energy supplied to the heating elements readily manifests itself in the radiation of heat both upwardly and downwardly from the burner. The partitions, however, are intended to interrupt some of this radiated heat and become thereby heated, so that they may in turn transmit this absorbed heat to air passing over their surfaces and such passage of air is facilitated and promoted by the flue-like arrangement of the spacing of the partitions.

The heating elements are not necessarily interposed in every space between the partitions, although they may be so if thought necessary or desirable, but it has been found very satisfactory to arrange them on only some of the spaces, for instance, in every alternate space as shown in the drawings, the spaces not so provided with heating elements having heated walls in the form of the partitions and forming flues therebetween.

It is a fact that radiated heat is not highly effective in the heating of gases, such as air, in the same manner as contact of such gases, with a heated surface inducing convection will effect the rapid heating of such gases, especially within a closed container such as an oven. Therefore, the described arrangement lends itself excellently to oven heating as it promotes a series of convection currents and turbulence within the air of the oven, resulting in rapid and even distribution of heat throughout the atmosphere of the oven; and this manifests itself in the ability of an oven so equipped to reach a very high temperature in a short space of time, and, in cooking, to obtain a high degree of efficiency and quality as is extremely desirable.

For the sake of permitting the wiring connections 5 to extend directly from one connection to another without crossing or bending to irregular forms the axes of alternate coils may be arranged in different planes as shown in Figure 2, and with the form of transverse insulators 8 shown, this may be simply accomplished by inserting the insulators with their coil-receiving orifices disposed towards the top or the bottom of the burner as the case may be.

The upper and lower edges of the partitions 4 may be slightly offset or flanged as shown for the purpose of adding rigidity thereto, although this may be accomplished by corrugating or any other suitable manner, and it will be obvious that these partitions will serve as a grid for the support of cooking utensils or other particles directly on the burner, if so desired.

The end walls of the frame 1 extending parallel and comparatively close to the transverse strips 3 form, with the said strips, compartments for the housing and protection of the wiring connections 5.

9 is a plug in one of the end walls of the burner frame and has mounted therein terminals 10 adapted to enter a suitable receptacle 11 in the back of the oven with which the burner may be used. These terminals may be cranked or offset from their normal plane, so that upon reversal of the burner, the extremities of the terminals will be below the medial plane of the burner, or thereabove, as the case may be, and as is illustrated in full and in dotted lines respectively in Figure 3. Thus in an oven, such as shown in Figure 4, the burner may be capable of being inserted in either the full line or dotted line position shown in the said figure, while the terminals 10 will still enter the same receptacle 11. This provides a simple adjustment of the burner where it is desired.

Referring more particularly to the said Figure 4, the oven 12 is shown as being divided by the burner into upper and lower compartments 13 and 14, respectively, which due to the open nature of the burner are open to convection currents therebetween, these convection currents being promoted both by the direct heat of the elements 7 and the heat of the partitions 4, as well as the flue action of the said partitions.

It is preferred that the internal surfaces of the oven be plated for reflective purposes, so that such reflected heat will be directed against articles being cooked in the oven, and also that the reflecting nature of such surfaces will reduce escape of the heat through the walls of the oven. The partitions and other parts of the burner may also be polished for the sake of cleanliness and also, in the case of broiling underneath the burner, to provide for a certain reflection of heat from the partitions towards the article being broiled. It is preferred that the provision of the polished surface be secured by means of chromium or similar plating having highly refractory properties whereby the reflecting nature of the surfaces will not be destroyed by the heat of the burner.

It is, of course, to be understood that although I have illustrated and described in detail the preferred embodiment of my invention, the invention is not to be thus limited but only insofar as defined by the scope and spirit in the appended claims.

I claim as my invention:

1. In an electrical heating device, a pair of horizontally spaced sidewalls having spaced slots therein, each slot on one sidewall being opposite a slot in the other sidewall, insulators resting in said slots for support jointly by said sidewalls, a heating element extending through said insulators whereby said element is maintained in spaced relation with said walls, and means for connecting said element to a suitable source of electric power.

2. In an electrical heating device, a plurality of spaced parallel heating elements, a flue for each of said elements comprising spaced metallic sidewalls parallel to said elements, said flues being transversely spaced with respect to each other to provide air gaps therebetween.

3. In an electrical heating device, a rectangular frame, a plurality of parallel spaced partitions therein forming a plurality of elongated air gaps, and heating elements arranged in other than adjacent air gaps and in substantial parallelism with said partitions.

4. In an electrical heating device, a rectangular frame, a plurality of parallel spaced partitions therein forming a plurality of elongated air gaps, and heating elements arranged in alternate air gaps and in substantial parallelism with said partitions.

5. In an electric heating element, a rectangular frame, two parallel strips connecting two opposite sides of said frame at points near the opposite ends thereof, a plurality of parallel partitions connected at their ends to said strips, heating elements extending through said first-mentioned strips for endwise support thereby, wiring connections between said elements on the outer sides of said strips, and a plug connection carried by the frame wall adjacent one of said first-named strips whereby the wiring at one end of the coils leading to said plug connection is protected by said frame wall, the wiring connecting the other end of said coils being protected by the frame wall adjacent the other of said first-named strips whereby all the wiring between coils is protected against accidental damage.

6. In an electrical heating device, a horizontally disposed frame, a plurality of spaced heating elements in parallel relationship supported in said frame, said elements being successively staggered so that one set of alternate elements lie in one plane and the other set of alternate elements lie in another plane, electrical connections disposed substantially in the plane of the one set of elements connecting the elements therein in series, electrical connections disposed substantially in the plane of the other set of elements connecting the elements therein in series, and further electrical connections for connecting each set of elements to a source of electrical power.

7. In an electrical heating device, a horizontally disposed frame, a plurality of spaced heating elements in parallel relationship supported in said frame, said elements being successively staggered so that one set of alternate elements lie in one plane and the other set of alternate elements lie in another plane, electrical connections disposed substantially in the plane of the one set of elements connecting the elements therein in series, electrical connections disposed substantially in the plane of the other set of elements connecting the elements therein in series, a three way electrical terminal carried by said frame for connection to a source of electric power, one prong of said terminal being commonly connected to each set of elements, and the other two prongs respectively connected to said sets of elements, whereby if one of said two prongs fails to function electrically alternate elements contained in said frame may be heated by current through the other two prongs.

8. In an electrical heating device, a rectangular frame having a plurality of parallel spaced metallic strips lying in vertical planes and connecting opposite sides of said frame, a plurality of heating elements suspended from the sides of said frame between alternate strips and parallel therewith, insulators supporting said elements in said frame, each of said insulators being staggered with respect to each adjacent insulator whereby the axes of alternate insulators lie substantially in one plane while the axes of the other alternate insulators lie in another plane, transverse insulators supported by said strips and each having a hole therethrough for the passage of one of said elements whereby said elements are maintained in spaced relation with said strips, said transverse insulators when supported in normal manner having the holes thereof substantially alined with the holes through one of said first-named insulators and when supported in inverted manner being adapted to aline the holes therethrough with the holes through the lower of said first-named insulators.

9. In an electrical heating device, a rectangular frame, transverse member within and adjacent the ends of said frame, longitudinally arranged parallel partitions carried by said transverse members, heating elements extending between said partitions and through said transverse members, and electrical connections between said elements arranged between said transverse members and the ends of said frame.

In testimony whereof I have hereunto subscribed my name at Detroit, Wayne County, Michigan.

WARREN NOBLE.